(12) United States Patent
Mizuta

(10) Patent No.: US 7,848,626 B2
(45) Date of Patent: Dec. 7, 2010

(54) SHAKE DETECTION APPARATUS AND SHAKE DETECTION METHOD

(75) Inventor: Tomoyuki Mizuta, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 71 days.

(21) Appl. No.: 12/349,881

(22) Filed: Jan. 7, 2009

(65) Prior Publication Data

US 2009/0180769 A1 Jul. 16, 2009

(30) Foreign Application Priority Data

Jan. 11, 2008 (JP) ............................. 2008-004654

(51) Int. Cl.
- G03B 17/00 (2006.01)
- H04N 5/228 (2006.01)

(52) U.S. Cl. ..................... 396/52; 348/208.2; 348/208.3
(58) Field of Classification Search .................. 396/52; 348/208.2, 208.3
See application file for complete search history.

(56) References Cited

U.S. PATENT DOCUMENTS 5,745,799 A * 4/1998 Morofuji ..................... 396/55
6,630,950 B1 10/2003 Ohkawara
2004/0052513 A1 3/2004 Ohkawara
2007/0146488 A1* 6/2007 Higurashi et al. ........ 348/208.3
2007/0166021 A1* 7/2007 Yamazaki ................... 396/55

FOREIGN PATENT DOCUMENTS

| JP | 11-275431 A | 10/1999 |
|---|---|---|
| JP | 11-284902 A | 10/1999 |
| JP | 11-298788 A | 10/1999 |
| JP | 2000-39640 A | 2/2000 |

* cited by examiner

Primary Examiner—Rodney E Fuller
(74) Attorney, Agent, or Firm—Sughrue Mion, PLLC

(57) ABSTRACT

A shake detection technique which does not mistakenly detect a swing-back component at the end of panning as a shake is provided. A shake detection apparatus includes: a sensor which detects velocity or angular velocity; a high-pass filter which removes a low-frequency component from an output signal of the sensor; a shake detection device which detects shake of an apparatus body based on an output signal from the high-pass filter; a determination device which determines whether the output signal of the high-pass filter contains a swing-back component outputted when a shake continued in one direction stops; and a removal device which removes the swing-back component from the output signal of the high-pass filter based on a determination result of the determination device.

2 Claims, 11 Drawing Sheets

FIG.7

| FOCAL LENGTH[mm] | MECHANICAL COEFFICIENT $\gamma$ |
|---|---|
| 30 | 0.2 |
| 40 | 0.3 |
| 50 | 0.4 |
| 60 | 0.5 |
| 70 | 0.6 |
| 80 | 0.7 |
| 90 | 0.8 |
| 100 | 0.9 |

FIG.10

| HPF | LPF | SHAKE | SW77 |
|---|---|---|---|
| LARGER | SMALLER | LARGER | OFF |
| LARGER | LARGER | SMALLER | ON |
| SMALLER | SMALLER | SMALLER | OFF |
| SMALLER | LARGER | LARGER | OFF |

SHAKE DETECTION APPARATUS AND SHAKE DETECTION METHOD

BACKGROUND OF THE INVENTION

1. Field of the Invention

The present invention relates to a shake detection apparatus and shake detection method, and more particularly, to a shake detection apparatus and shake detection method which detect shake by removing a low-frequency component from an output signal of a gyro sensor using a high-pass filter.

2. Description of the Related Art

A mechanism used in an image pickup apparatus such as a camera to compensate for camera shake caused by a photographer is known. Such a camera shake compensation mechanism compensates for shake by detecting angular velocity using a gyro sensor, calculating an amount of shake of the image pickup apparatus from the detected angular velocity, and moving a part of an image pickup unit such as a taking lens or image sensor in a plane perpendicular to a photographic optical axis in such a way as to cancel off the calculated amount of shake. An output signal from a gyro sensor contains unnecessary low-frequency components such as a DC component caused by drift, and thus the low-frequency components are removed by a high-pass filter.

When a camera equipped with a shake compensation mechanism using a gyro sensor and high-pass filter such as described above is panned, swing-back phenomenon occurs at the end of panning, where the swing-back phenomenon is a phenomenon in which even though the camera stops, a screen moves as though the camera were moved in a direction opposite to the preceding shake. The swing-back phenomenon is caused by an overshoot phenomenon of the high-pass filter.

To prevent the swing-back phenomenon, Japanese Patent Application Laid-Open No. 11-284902 describes a technique for shifting cut-off frequency of a high-pass filter to a high-frequency side during panning of a camera. The technique makes it possible to achieve natural camera work without a swing-back phenomenon at the end of panning.

SUMMARY OF THE INVENTION

However, the technique described in Japanese Patent Application Laid-Open No. 11-284902 has the disadvantage that although the swing-back phenomenon is reduced, the shifting of the cut-off frequency to the high-frequency side results in reduced shake compensation effect for low-frequency shaking during panning.

The present invention has been made in view of the above circumstances and has an object to provide a shake detection apparatus and shake detection method which can reduce misdetection of shake due to a swing-back component at the end of panning while maintaining accuracy in shake detection during panning.

To achieve the above object, according to a first aspect of the present invention, there is provided a shake detection apparatus including: a sensor which detects velocity or angular velocity; a high-pass filter which removes a low-frequency component from an output signal of the sensor; a shake detection device which detects shake of an apparatus body based on an output signal from the high-pass filter; a determination device which determines whether the output signal of the high-pass filter contains a swing-back component outputted when a shake continued in one direction stops; and a removal device which removes the swing-back component from the output signal of the high-pass filter based on a determination result of the determination device.

This makes it possible to remove the swing-back component from the output signal of the high-pass filter and thereby perform an optimum camera shake compensation free of swing-back.

According to a second aspect of the present invention, in the shake detection apparatus according to the first aspect, the determination device includes an integrating device that integrates the output signal of the high-pass filter, and the determination device determines that the output signal of the high-pass filter contains the swing-back component when the output signal of the high-pass filter is larger than a first threshold and an inversion signal of the output signal of the integrating device is larger than a second threshold or when the output signal of the high-pass filter is smaller than the negative of the first threshold and an inversion signal of an output signal of the integrating device is smaller than the negative of the second threshold.

This makes it possible to detect the swing-back component at the end of panning without mistakenly detecting the swing-back component as a shake.

According to a third aspect of the present invention, in the shake detection apparatus according to the second aspect, the removal device includes an adder device which adds the output signal of the high-pass filter and the output signal of the integrating device, and the removal device outputs the output signal of the high-pass filter as it is when the determination device determines that no swing-back component is contained in the output signal of the high-pass filter, and outputs an output signal obtained by adding the output signal of the high-pass filter and the output signal of the integrating device when the determination device determines that the swing-back component is contained in the output signal of the high-pass filter.

This makes it possible to remove the swing-back component of the high-pass filter.

To achieve the above object, according to a fourth aspect of the present invention, there is provided a shake detection method including: a step of detecting velocity or angular velocity using a sensor; a step of removing a low-frequency component from an output signal of the sensor using a high-pass filter a step of detecting shake of an apparatus body based on an output signal from the high-pass filter; a determination step of determining whether the output signal of the high-pass filter contains a swing-back component outputted when a shake continued in one direction stops; and a removal step of removing the swing-back component from the output signal of the high-pass filter based on a determination result of the determination step.

This makes it possible to remove the swing-back component from the output signal of the high-pass filter and thereby perform an optimum camera shake compensation free of swing-back.

According to aspects of the present invention, a shake detection apparatus and shake detection method which do not mistakenly detect the swing-back component at the end of panning as a shake, can be provided.

BRIEF DESCRIPTION OF THE DRAWINGS

FIG. 7 is a diagram showing values of mechanical coefficient γ for each focal length, where the mechanical coefficient γ is used to calculate lens displacement;

FIG. 10 is a diagram showing on/off criteria used by the determination unit 76 to determine whether to turn on or off a switch 77.

DETAILED DESCRIPTION OF THE PREFERRED EMBODIMENTS

Preferred embodiments of the present invention will be described below with reference to the drawings.

<Image Pickup Unit>

Figure 1:
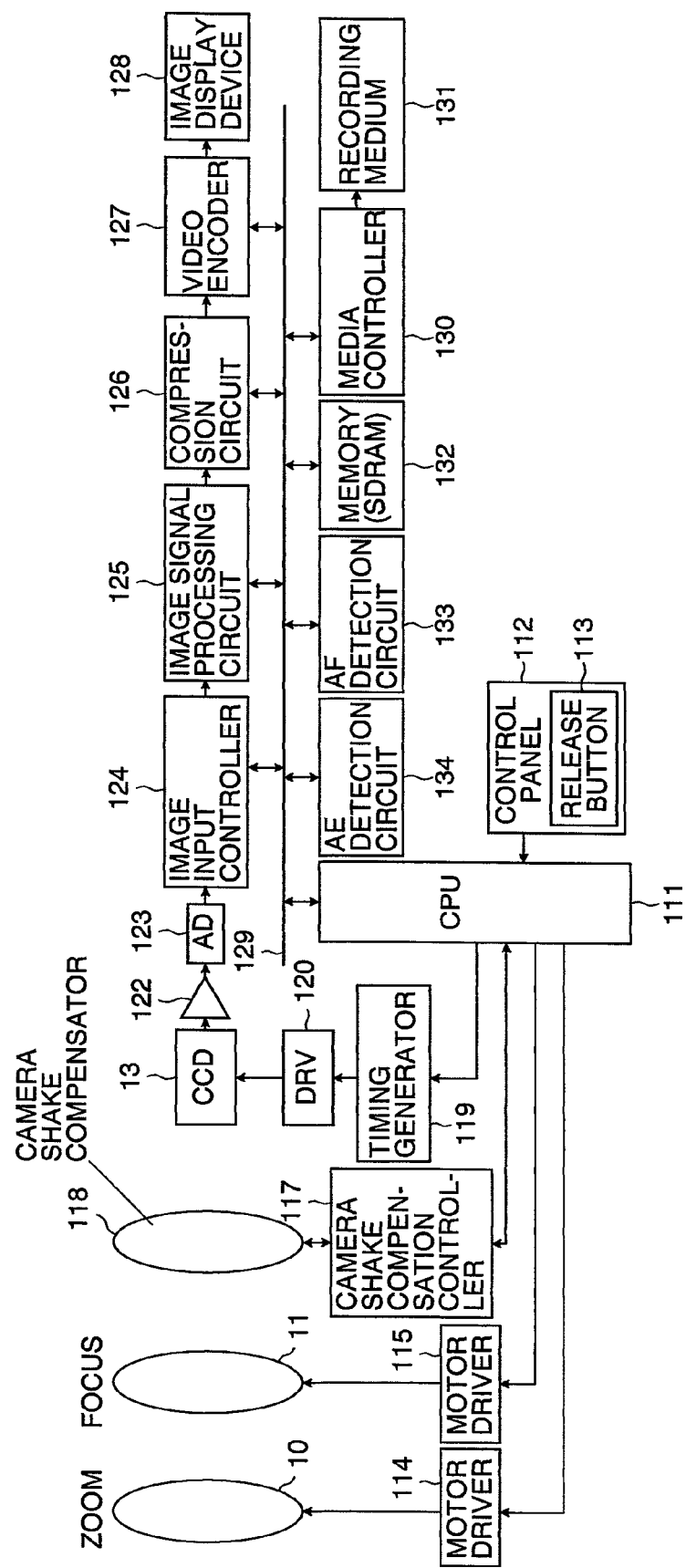
FIG. 1 is a block diagram showing an electrical configuration of a digital camera 1 resulting from application of the present invention.

FIG. 1 is a block diagram showing an electrical configuration of a digital camera 1 resulting from application of the present invention.

As shown in FIG. 1, the digital camera 1 according to the present embodiment includes a CPU 111, control panel 112, zoom lens motor driver 114, zoom lens 10, focus lens motor driver 115, focus lens 11, camera shake compensation controller 117, camera shake compensator 118, timing generator 119, CCD driver 120, CCD 13, analog signal processor 122, A/D converter 123, image input controller 124, image signal processing circuit 125, compression circuit 126, video encoder 127, image display device 128, bus 129, media controller 130, recording medium 131, memory (SDRAM) 132, AF detection circuit 133, and AE detection circuit 134.

The above components operate under the control of the CPU 111, which controls the components of the digital camera 1 by executing a predetermined control program based on input from the control panel 112.

The CPU 111 contains a program ROM. In addition to the control program executed by the CPU 111, the program ROM stores various data necessary for control. The CPU 111 loads the control program onto the memory 132 from the program ROM, executes the control program as required, and thereby controls the components of the digital camera 1.

The memory 132 is used not only as an execution area of the program, but also as a temporary storage area of image data and the like and various types of working area.

The control panel 112 includes typical controls of a camera including in addition to a release button 113, power switch, shooting mode dial, and camera shake compensation switch and outputs a signal corresponding to a user action to the CPU 111. The release button 113 includes a switch S1 and switch S2. The switch S1, which turns on when the release button 113 is half-pressed, causes focus to be locked and preparations for shooting including metering to be started. The switch S2, which turns on when the release button 113 is full-pressed, causes an image to be captured.

The focus lens 11 moves back and forth along an optical axis of the zoom lens 10, being driven by the focus lens motor driver 115. The CPU 111 controls the movement of the focus lens 11 via the focus lens motor driver 115 and thereby performs focusing.

The zoom lens 10 moves back and forth along an optical axis of the focus lens 11, being driven by the zoom lens motor driver 114. The CPU 111 controls the movement of the zoom lens 10 via the zoom lens motor driver 114 and thereby performs zooms.

The camera shake compensator 118, which includes a compensation lens 12, compensates a subject image coming through the zoom lens 10 and focus lens 11 for camera shake under the control of the camera shake compensation controller 117. Details of the camera shake compensation controller 117 and camera shake compensator 118 will be described later.

The CCD 13 is installed downstream of the camera shake compensator 118 and receives subject light transmitted through the compensation lens 12. As is well known, the CCD 13 has a light-receiving surface on which a large number of light-receiving elements are arranged in a matrix. The subject light transmitted through the compensation lens 12 is focused on the light-receiving surface of the CCD 13 and converted into an electrical signal by the light-receiving elements.

The CCD 13 outputs charges stored in pixels, line by line, as a serial image signal in sync with a vertical transfer clock and horizontal transfer clock supplied from the timing generator 119 via the CCD driver 120. The CPU 111 controls the timing generator 119 and thereby controls driving of the CCD 13.

Charging time (exposure time) of each pixel is determined by an electronic shutter drive signal provided by the timing generator 119. The CPU 111 specifies the charging time to the timing generator 119.

Output of the image signal is started when the digital camera 1 is set to a shooting mode. That is, when the digital camera 1 is set to the shooting mode, the image signal starts to be outputted to display live view (pass-through image) on the image display device 128. The image signal output for live view stops once when actual photography is ordered, and resumes when the actual photography is finished.

The image signal outputted from the CCD 13 is an analog signal, which is captured into the analog signal processor 122.

The analog signal processor 122 includes a correlated double sampler (CDS) and automatic gain control (AGC) circuit. The CDS removes noise contained in the image signal and the AGC circuit amplifies the image signal with a predetermined gain after the noise removal. After being subjected to required signal processing at the analog signal processor 122, the analog image signal is captured into the A/D converter 123.

The A/D converter 123 converts the captured analog image signal into a digital image signal of a predetermined tone range in bits. The image signal, which is so-called raw data, contains tone values which represent RGB densities of individual pixels.

The image input controller 124 incorporates a line buffer of a predetermined capacity and accumulates one frame of the image signal outputted from the A/D converter 123. The one frame of image signal accumulated in the image input controller 124 is stored in the memory 132 via the bus 129.

The bus 129 is connected with the image signal processing circuit 125, compression circuit 126, video encoder 127, media controller 130, AF detection circuit 133, and AE detection circuit 134, and the like as well as the CPU 111, memory 132, and the image input controller 124, all of which can exchange information via the bus 129.

The one frame of image signal stored in the memory 132 is captured into the image signal processing circuit 125 dot-sequentially (in the order of pixels).

The image signal processing circuit 125 performs predetermined signal processing on the image signals of R, G, and B colors captured dot-sequentially and thereby generates an image signal (Y/C signal) which includes a luminance signal Y and color-difference signals Cr and Cb.

At instructions from the CPU 111, the AF detection circuit 133 captures the R, G, and B image signals from the memory 132 via the image input controller 124 and calculates a focus score value necessary for AF (Automatic Focus) control. The AF detection circuit 133 includes a high pass filter which passes only a high frequency component of the G signal, an absolute value generator, a focus area extractor which extracts a signal in a predetermined focus area set in a screen, and an integrator which integrates absolute value data in the focus area. The AF detection circuit 133 outputs the integrated absolute value data in the focus area to the CPU 111 as a focus score value. During AF control, CPU 111 searches for a position at which the focus score value outputted from the AF detection circuit 133 reaches a local maximum, moves the focus lens 11 to that position, and thereby focuses on a main subject.

At instructions from the CPU 111, the AE detection circuit 134 captures the R, G, and B image signals from the memory 132 via the image input controller 124 and calculates an integrated value necessary for AE control. The CPU 111 calculates a luminance value from the integrated value and determines an exposure value from the luminance value. Also, the CPU 111 determines an f-stop number and shutter speed from the exposure value based on a predetermined program chart. In so doing, the CPU 111 determines to use a flash unit 136 as fill-in light if necessary.

Based on compression instructions from the CPU 111, the compression circuit 126 compresses inputted image signal (Y/C signal) which includes the luminance signal Y and color-difference signals Cr and Cb in a predetermined format (e.g., JPEG) and thereby generates compressed image data. Also, based on decompression instructions from the CPU 111, the compression circuit 126 decompresses inputted compressed image data in a predetermined format and thereby generates uncompressed image data.

At instructions from the CPU 111, the video encoder 127 controls display on the image display device 128.

At instructions from the CPU 111, media controller 130 controls reads and writes of data from/to the recording medium 131. The recording medium 131 may be attachable/detachable to/from a camera body as in the case of a memory card or may be incorporated in the camera body. The recording medium 131, if configured to be attachable/detachable, is used being inserted in a card slot provided in the camera body.

<Lens Moving Mechanism for Camera Shake Compensation>

Next, the camera shake compensation controller 117 and camera shake compensator 118 will be described.

The digital camera 1 allows the user to switch between Camera Shake Compensation ON mode and Camera Shake Compensation OFF mode using the control panel 112. In the Camera Shake Compensation ON mode, the compensation lens 12 is moved and controlled in such a way as to cancel off camera shake. In the Camera Shake Compensation OFF mode, the compensation lens 12 is controlled to keep stopped.

Figure 2:
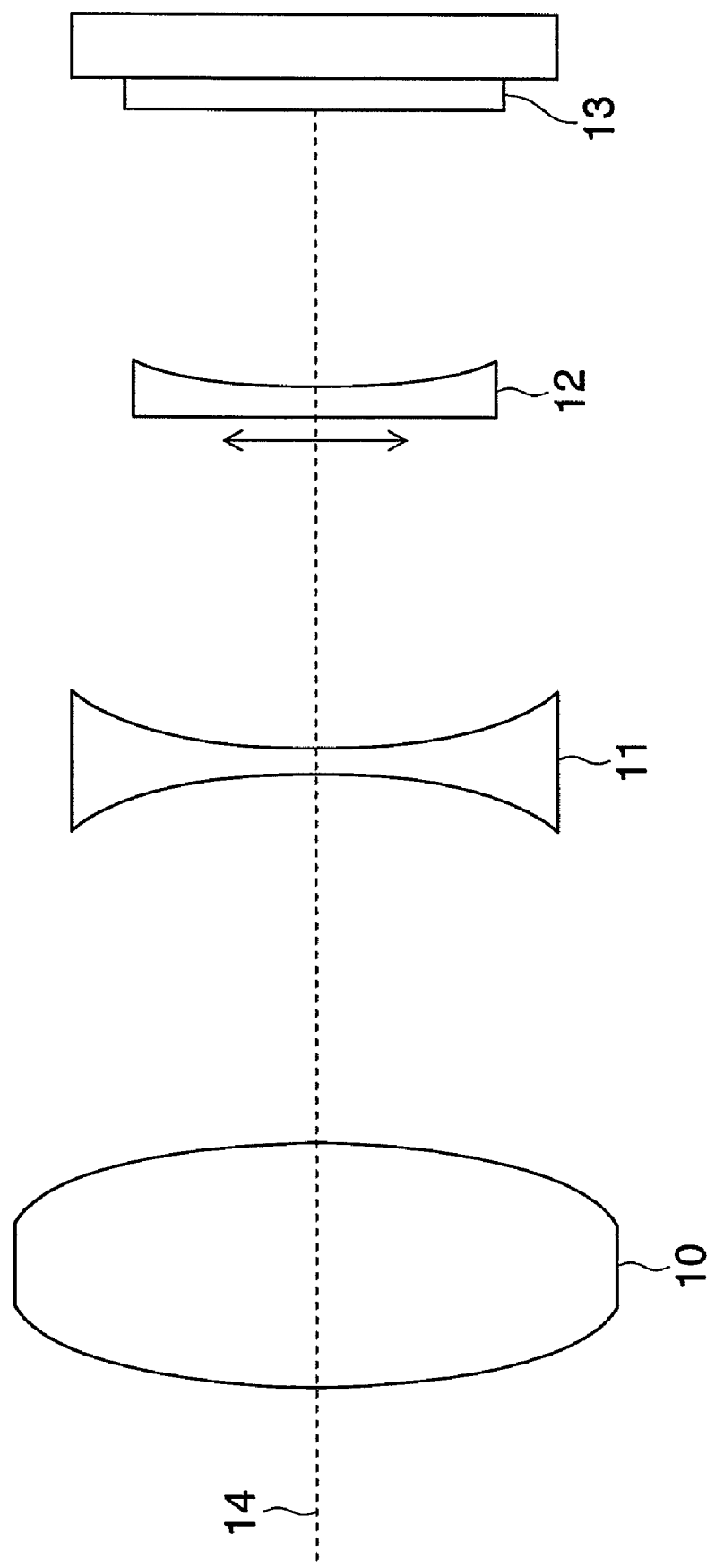
FIG. 2 is a diagram showing an optical system of the digital camera 1.

FIG. 2 is a diagram showing an optical system of the digital camera 1. The optical system of the digital camera 1 includes the zoom lens 10, focus lens 11, and compensation lens 12. The CCD 13 is placed on an optical axis 14 of the optical system. As described above, the CCD 13 converts an image of a subject into an electrical signal.

When camera shake occurs, the subject image moves on the CCD 13 within a frame, and thus the CCD 13 generates an electrical signal of a blurred image. To detect such camera shake, X-direction gyro sensor 50 (see FIG. 6) and Y-direction gyro sensor (not shown) are installed in the camera body or a lens assembly. The gyro sensors output signals which represent angular velocity. Gyro sensors which output signals representing angular acceleration may be used alternatively.

When there is no camera shake, an optical axis of the compensation lens 12 coincides with the optical axis 14 of the optical system. When camera shake is detected by the X gyro sensor 50 and/or Y gyro sensor, the compensation lens 12 moves in the X direction and/or Y direction according to the magnitude and direction of the camera shake. Consequently, the image formed on the CCD 13 remains almost stationary (static) and the CCD 13 outputs a signal which represents a sharp image.

Figure 3:
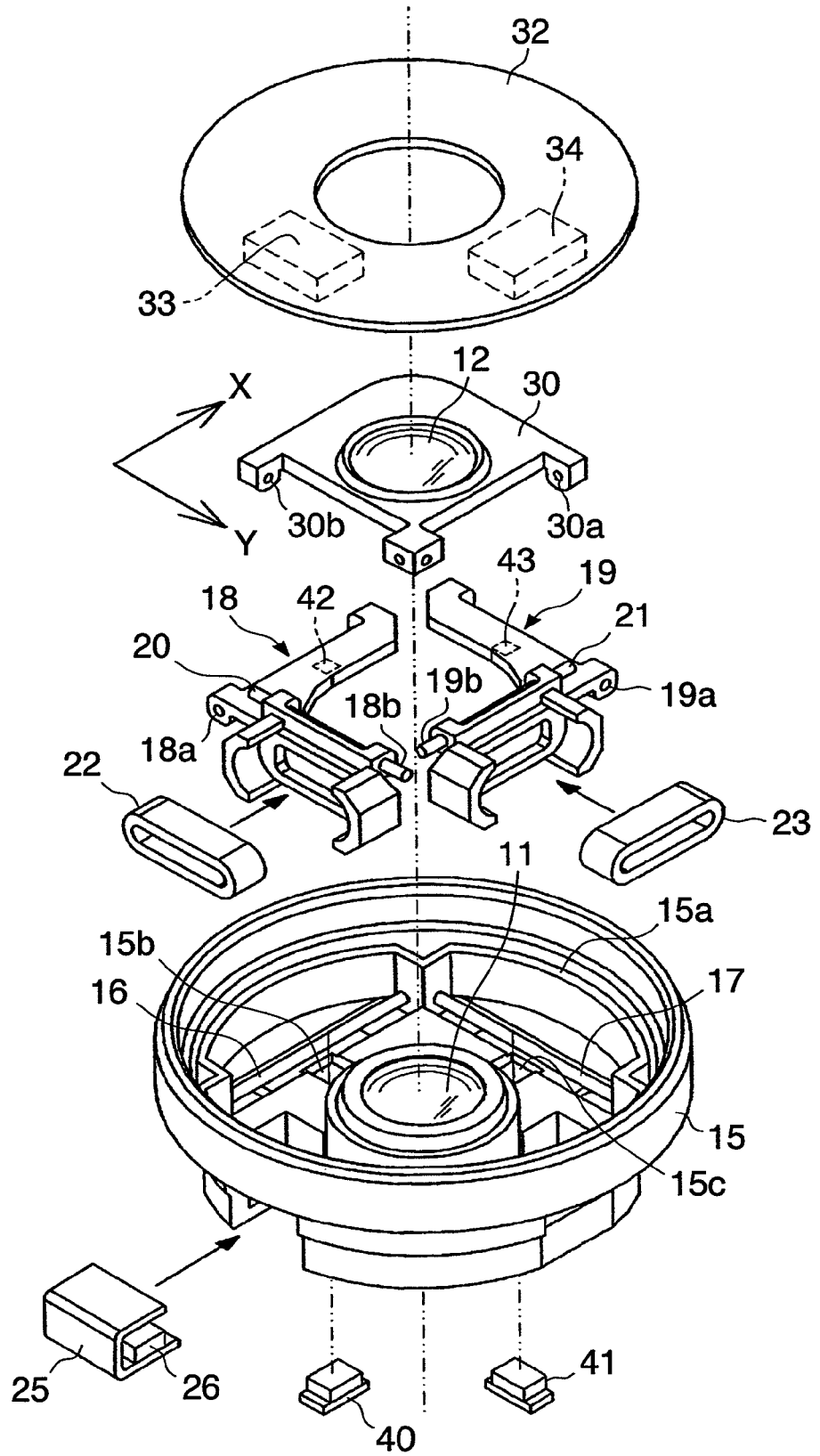
FIG. 3 is an exploded perspective view showing a lens moving mechanism.
Figure 4:
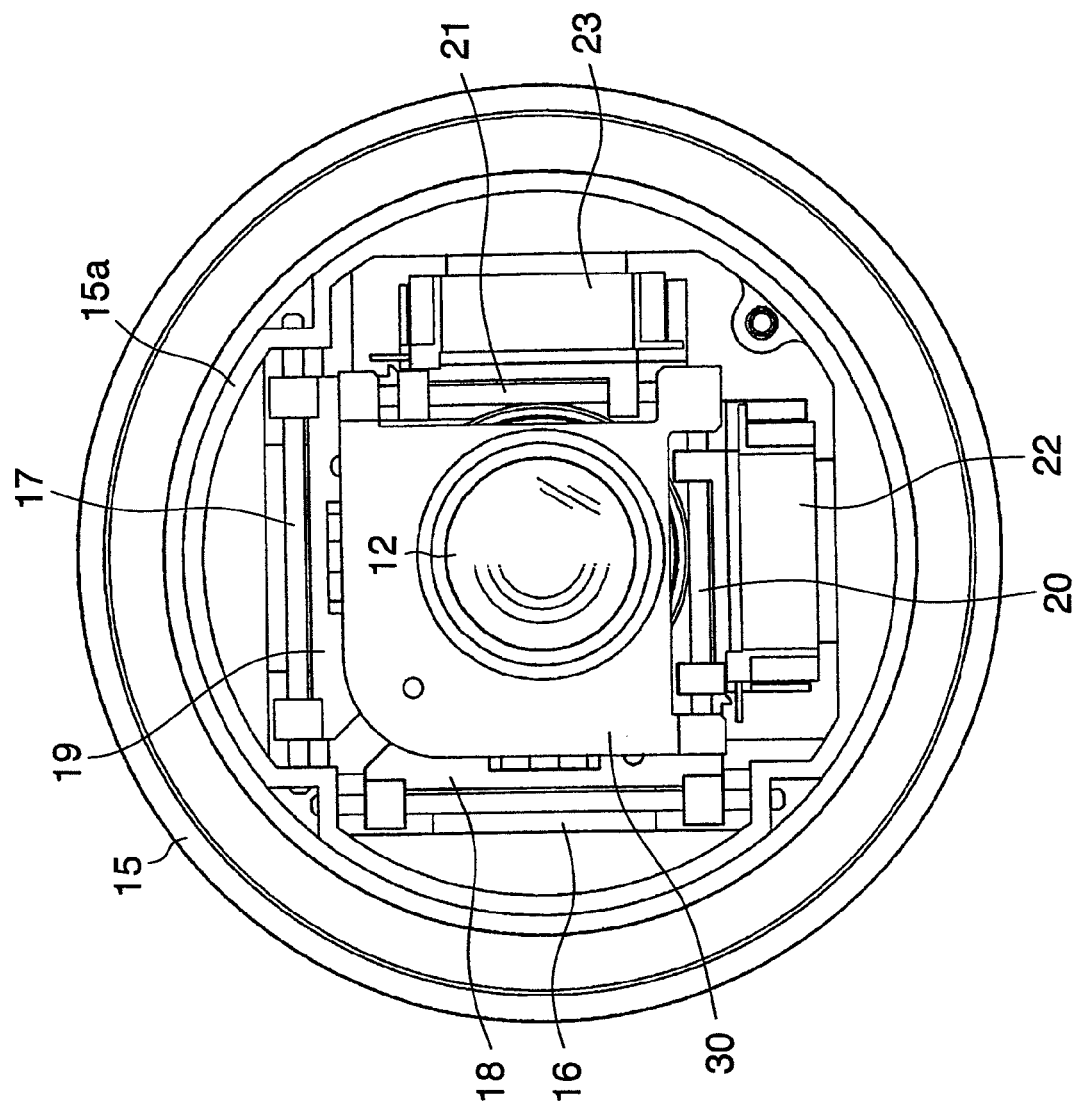
FIG. 4 is a front view of the lens moving mechanism with a cover removed.
Figure 5:
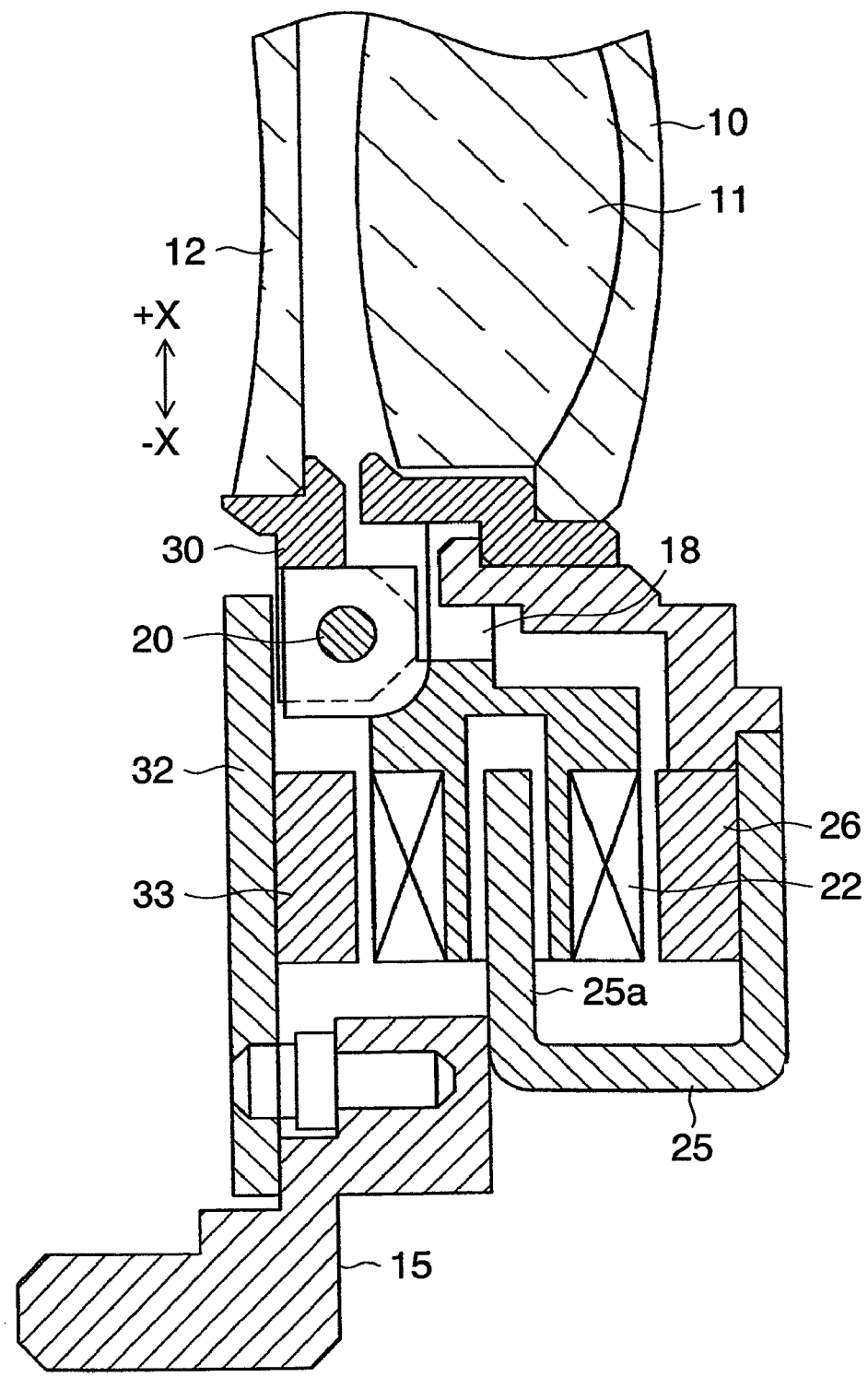
FIG. 5 is a sectional view showing part of the lens moving mechanism.

Next, a lens moving mechanism of the camera shake compensation controller 117 and camera shake compensator 118 will be described. FIG. 3 is an exploded perspective view showing the lens moving mechanism and FIG. 4 is a front view of the lens moving mechanism with a cover removed. FIG. 5 is a sectional view showing part of the lens moving mechanism.

In FIGS. 3 and 4, the zoom lens 10 and focus lens 11 are mounted in a lens barrel 15. The lens barrel 15 is fixed to the lens assembly. Also, a main guide shaft 16 extending in the X direction and a main guide shaft 17 extending in the Y direction are attached to the lens barrel 15. Also, an X-slider 18 movable in the X direction and a Y-slider 19 movable in the Y direction and are housed in the lens barrel 15. The X-slider 18 and Y-slider 19 are approximately L-shaped when viewed from the front.

A pair of shaft holes 18a is formed in the X-slider 18 to slidably accept the main guide shaft 16. Similarly, a pair of shaft holes 19a in the Y-slider 19 slidably accepts the main guide shaft 17.

Also, a pair of shaft holes 18b are formed in the X-slider 18 to slidably accept a sub-guide shaft 20 extending in the Y direction. A pair of shaft holes 19b in the Y-slider 19 slidably accepts a sub-guide shaft 21 extending in the X direction. In FIG. 3, the sub-guide shaft 20 is passing through the shaft holes 18b, and the sub-guide shaft 21 is passing through the shaft holes 19b.

A flat ring-shaped coil 22 is mounted in the X-slider 18. Similarly, a coil 23 is mounted in the Y-slider 19. A yoke 25 with a permanent magnet 26 installed inside is mounted in the lens barrel 15 to generate an X-direction electromagnetic force in conjunction with the coil 22. A yoke and permanent magnet used to generate a Y-direction electromagnetic force in conjunction with the coil 23 are not illustrated in the figure.

A lens holder 30 holds the compensation lens 12. A pair of holes 30a is formed in the lens holder 30. Opposite ends of the sub.-guide shaft 21 extending in the X direction are fitted in the holes 30a and fastened with an adhesive or the like to prevent movement of the sub-guide shaft 21. Similarly, the sub-guide shaft 20 is held securely in a pair of holes 30b.

A cover 32 is put on the lens holder 30 in such a way as to hide the sliders 18 and 19. The cover 32 is placed on a step 15a in the lens barrel 15. Two permanent magnets 33 and 34 are mounted on an inner surface of the cover 32. The permanent magnet 33 faces the yoke 25 and the permanent magnet 34 faces another yoke (not shown).

As shown in FIG. 5, the permanent magnets 26 and 33 are located on both sides of the coil 22 with a bent-up strip 25a of the yoke 25 getting into the coil 22. When the coil 22 is energized, a magnetic field generated in the coil 22 generates an electromagnetic force in conjunction with magnetic fields of the permanent magnets 26 and 33. The electromagnetic force acts in the +X or −X direction depending on the direction of current in the coil 22, causing the X-slider 18 to move in the +X or −X direction. Similarly, when the coil 23 is energized, a magnetic field generated in the coil 23 generates an electromagnetic force in conjunction with magnetic fields of a permanent magnet (not shown) and the permanent magnet 34, causing the Y-slider 19 to move in the +Y or −Y direction.

An X Hall element 40 and Y Hall element 41 are housed in holes 15b and 15c in the lens barrel 15. The X Hall element 40 generates a voltage in response to a magnetic field of a small magnet 42 embedded under the X-slider 18. The voltage corresponds to an X-directional position of the X-slider 18. Also, the Y Hall element 41 generates a voltage in response to a magnetic field of a magnet 43 embedded under the Y-slider 19, where the voltage corresponds to a Y-directional position of the Y-slider 19. Each of the Hall elements 40 and 41 generates a signal in a voltage range of, for example, 0 to 5 V according to the position of the compensation lens 12. When the output signals of the Hall elements 40 and 41 are 2.5 V (reference voltage), the X-slider 18 is located at an X reference position and the Y-slider 19 is located at a Y reference position. In this state, the optical axis of the compensation lens 12 coincides with the optical axis 14 of the optical system.

Next, operation of the lens moving mechanism of the camera shake compensation controller 117 and camera shake compensator 118 will be described. When the user turns on the digital camera in preparation for shooting, a control circuit (see FIG. 6) sets the reference voltage (2.5 V) as a target lens position signal. Then the control circuit places the directions and magnitudes of currents supplied to the coils 22 and 23 under feedback control such that output signals of the Hall elements 40 and 41 will reach the reference voltage, i.e., the target lens position signal. The feedback control moves the X-slider 18 toward the X reference position, and the Y-slider 19 toward the Y reference position. When the sliders 18 and 19 are set at the reference positions, the optical axis of the compensation lens 12 coincides with the optical axis 14 of the optical system. In the Camera Shake Compensation OFF mode, the target lens position signal is kept at the reference voltage even if there is camera shake. Consequently, the lens holder 30 remains stationary even if there is camera shake.

In the Camera Shake Compensation ON mode, the compensation lens 12 moves together with the lens holder 30 according to camera shake. Camera shake in the X direction is detected by the X gyro sensor 50 and camera shake in the Y direction is detected by the Y gyro sensor. When camera shake occurs, the gyro sensors generate angular velocity signals. The angular velocity signals of the gyro sensors are integrated separately and converted into X-direction and Y-direction angle signals, respectively. The angle signals are converted into a lens displacement signal corresponding to linear movement of the compensation lens 12. The resulting lens displacement signal is added to the reference voltage (2.5 V) to produce the target lens position signal. The lens displacement signal has a plus or minus sign depending on the direction of camera shake, and thus the target lens position signal varies around the reference voltage (2.5 V).

For example, when camera shake occurs in the +X direction, a minus (negative) lens displacement signal is added to the reference voltage and thereby the target lens position signal is calculated. Next, the direction and magnitude of current to be applied to the coil 22 is determined such that the output signal of the X Hall element 40 will coincide with the target lens position signal. The magnetic field generated when the coil 22 is energized and the magnetic fields of the permanent magnets 26 and 33 cause an electromagnetic force in the −X direction to act on the coil 22. The electromagnetic force causes the X-slider 18 to move in the −X direction along the main guide shaft 16. Also, the X-slider 18, which is linked to the lens holder 30 via the sub-guide shaft 20, pushes the lens holder 30 in the −X direction.

The sub-guide shaft 21 fixed in the lens holder 30 is guided by the shaft holes 19b in the Y-slider 19. Consequently, the X-slider 18 and lens holder 30 move together, being guided by the main guide shaft 16 and the pair of shaft holes 19a in the Y-slider 19.

When the X-slider 18 moves to the lens position corresponding to the target lens position signal, the output signal of the X Hall element 40 coincides with the target lens position signal. Consequently, the lens holder 30 moves in the −X direction by a distance corresponding to a stroke of the camera shake, and thus the image formed on the CCD 13 hardly moves. Thus, the CCD 13 generates an electrical signal of a clear image.

When the camera shake stops, since the lens displacement signal becomes zero, the target lens position signal coincides with the reference voltage (2.5 V). The direction and magnitude of the current applied to the coil 22 is determined such that the output signal of the X Hall element 40 will return to the reference voltage. Consequently, the X-slider 18 moves slowly toward the X reference position. Once the X-slider 18 returns to the X reference position, the direction and magnitude of the current applied to the coil 22 is controlled such that the X-slider 18 will be kept at the X reference position. Since the lens holder 30 returns together with the X-slider 18, the optical axis of the compensation lens 12 is brought into coincidence with the optical axis 14 of the optical system.

When −X direction camera shake occurs, a plus (positive) lens displacement signal with a value corresponding to the magnitude of the camera shake is added to the reference voltage and thereby the target lens position signal is calculated. The direction and magnitude of the current applied to the coil 22 is determined such that the output signal of the X Hall element 40 will coincide with the target lens position signal. When the coil 22 is energized, the X-slider 18 moves in the +X direction along the main guide shaft 16. When there is no longer −X direction camera shake, the X-slider 18 is returned slowly toward the X reference position and then kept at the X reference position. At this time, the optical axis of the compensation lens 12 coincides with the optical axis 14 of the optical system.

Y direction camera shake is handled in a similar manner. When Y direction camera shake occurs, the Y-slider 19 is moved in the Y direction by the coil 23. At this time, the lens holder 30 is pushed in the Y direction via the sub-guide shaft 21. The Y-slider 19 is guided by the main guide shaft 17 and the sub-guide shaft 20 of the lens holder 30 is guided by the shaft holes 18b in the X-slider 18. The movement of the lens holder 30 in the Y direction together with the Y-slider 19 prevents movement of the image due to the Y direction camera shake. Consequently, an image formed on the CCD 13 is almost stationary (static). When there is no longer Y direction camera shake, the Y-slider 19 is returned slowly to the Y reference position.

Actual camera shake occurs in both X direction and Y direction, and consequently, the lens holder 30 moves in both X direction and Y direction simultaneously.

<Lens Movement Control Circuits for Camera Shake Compensation>

Figure 6:
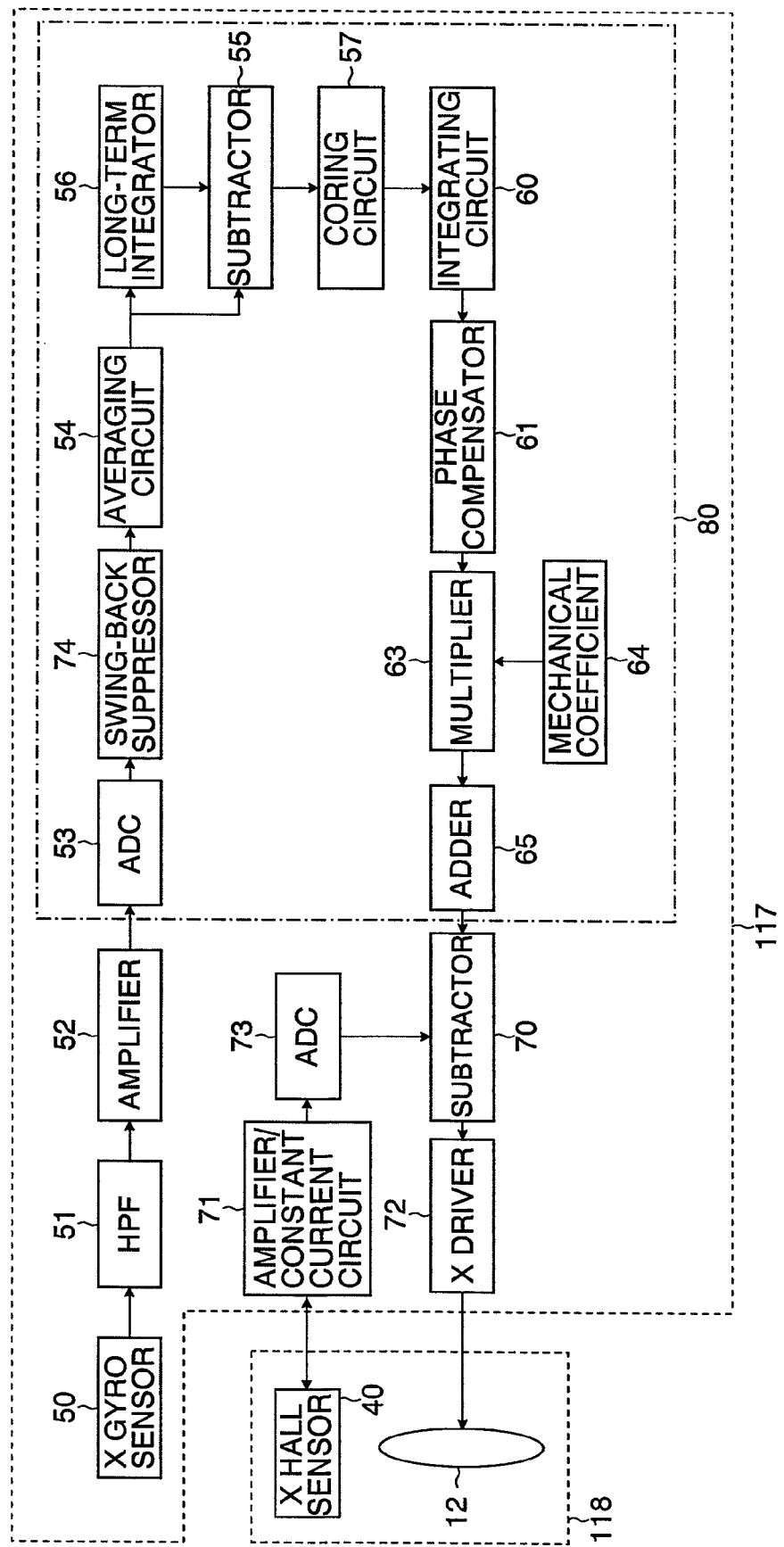
FIG. 6 is a block diagram showing a configuration of a control circuit used to reduce camera shake in the X direction.

Next, control circuits of the camera shake compensation controller 117 and camera shake compensator 118 will be described. Two control circuits are provided: for the X direction and Y direction. FIG. 6 is a block diagram showing a configuration of a control circuit used by the camera shake compensation controller 117 and camera shake compensator 118 to reduce camera shake in the X direction. When camera shake occurs in the X direction, the X gyro sensor 50 generates angular velocity signals. The angular velocity signals are sent to a high-pass filter 51 and high-frequency angular velocity signals are extracted. Then, the high-frequency angular velocity signals are amplified by an amplifier 52. Consequently, the angular velocity signals which are generated when the digital camera 1 is moved slowly are removed and only the angular velocity signals generated when the digital camera 1 is moved abruptly are amplified and sent to a CPU 80.

The CPU 80 is equipped with an A/D converter 53 to convert the analog angular velocity signals received from the amplifier 52 into digital angular velocity signals. The A/D converter 53 samples the analog angular velocity signals using a 16-kHz sampling pulse and thereby converts the analog angular velocity signals into 10-bit digital angular velocity signals. A swing-back controller 74 detects overshooting of the high-pass filter 51 based on the 10-bit angular velocity signals and performs signal processing so as to suppress the swing-back phenomenon. Details of the swing-back controller 74 will be described later.

The angular velocity signals in which the swing-back phenomenon is suppressed are sent to an averaging circuit 54 which calculates an average value of 16 angular velocity signals. Consequently, one angular velocity signal is obtained per 1 ms. This means that a transfer rate of the angular velocity signals is 1 kHz.

The averaged angular velocity signal is sent to a subtractor 55 and a long-term integrator 56. The long-term integrator 56 calculates the circulation integral of the angular velocity signal and thereby calculates a drift component of the angular velocity signal. Specifically, the calculation of the circulation integral involves determining a difference (which can be positive or negative) between the current signal and the previous signal and integrating the differences. The resulting drift component is sent to the subtractor 55 which subtracts the drift component from the currently inputted angular velocity signal.

The angular velocity signal compensated for drift is inputted in a coring circuit 57. When the angular velocity signal outputted from the subtractor 55 is equal to or smaller than a threshold level, the coring circuit 57 outputs 0. Consequently, fine camera shake is not subjected to a suppression operation. This makes it possible to prevent staggering of the compensation lens 12.

The angular velocity signal subjected to a coring process is sent to an integrating circuit 60. The integrating circuit 60 converts an input angular velocity signal A1 into an angle signal $A_{n+1}$ by means of integral calculus. The following equation is used for the integral calculus.

$$A_{n+1} = (A1 - A_n) \times \alpha + A_n \quad \text{[Formula 1]}$$

where $\alpha$ is a coefficient and $A_n$ is the previous integral value read out of a register.

A tilt angle of the optical system produced by the camera shake is calculated using the integral calculus. The angle signal $A_{n+1}$ obtained is sent to a limiter. The limiter cut off any excess part when the tilt angle exceeds a limit angle (e.g., 2 degrees). Thus, a maximum value of the angle signal $A_{n+1}$ equals the limit angle. The limit angle is constant regardless of focal length of the optical system. After being processed by the limiter, the angle signal $A_{n+1}$ is sent to a phase compensator 61 as an output signal of the integrating circuit 60. At the same time, the angle signal $A_{n+1}$ is stored in the register in order to be used as an integral value $A_n$ in a next integral calculation.

The phase compensator 61 adjusts a phase of the angle signal. The angle signal inputted in the phase compensator 61 contains a phase delay attributable to the time required by the X gyro sensor 50 to generate an output signal after the digital camera 1 shakes and processing time required by the integrating circuit 60. The phase compensator 61 compensates for the phase delay resulting from the addition of the above-mentioned times.

After going through the process of phase compensation, the angle signal is inputted in a multiplier 63. The multiplier 63 calculates a lens displacement by multiplying the angle signal by a mechanical coefficient $\gamma$ read out of a memory 64. The mechanical coefficient $\gamma$ depends on the focal length of the optical system: the larger the focal length, the larger the value of the mechanical coefficient $\gamma$. Actually, the mechanical coefficient $\gamma$ is determined by taking into consideration conversion efficiency of the coils 22 and 23 in addition to the focal length. The mechanical coefficient $\gamma$ takes values such as shown in FIG. 7 for each focal length. Because of the mechanical coefficient $\gamma$, an amount of travel of the compensation lens 12 increases as the focal length becomes longer even if camera shake is the same.

The lens displacement signal outputted from the multiplier 63 is added to the reference voltage (2.5 V) by an adder 65 to calculate the target lens position signal. As described above, the target lens position signal varies around the reference voltage according to the direction and magnitude of a deflection angle of the optical system. The target lens position signal is sent to a subtractor 70 as an output signal of the CPU 80.

An amplifier/constant current circuit 71 supplies a constant current to the X Hall element 40. The X Hall element 40 detects the position of the X-slider 18 based on the magnetic field of the magnet 42. Also, the amplifier/constant current circuit 71 amplifies the output signal of the X Hall element 40 and then inputs the signal in an A/D converter 73. The signal is converted into a digital signal by the A/D converter 73 and inputted in the subtractor 70. The subtractor 70 sends a signal corresponding to a difference between the two signals received from the adder 65 and A/D converter 73 to a driver 72. The driver 72 passes a current whose magnitude corresponds to that of the output signal of the subtractor 70 and whose direction corresponds to the sign of the output signal through the coil 22 to move the compensation lens 12 in the +X or −X direction.

Incidentally, the threshold level of the coring circuit 57, the coefficient $\alpha$ and limiter value of the integrating circuit 60, an addition coefficient $\beta$ of a memory 62, the mechanical coefficient $\gamma$ of the memory 64, the reference voltage of the adder 65, and the like are set by the CPU 111.

Next, operation of the control circuits of the camera shake compensation controller 117 and camera shake compensator 118 will be described. When camera shake occurs, for example, in the +X direction, the X gyro sensor 50 generates an angular velocity signal whose value has a minus sign and corresponds to the magnitude of the angular velocity. When the shake subsides, the X gyro sensor 50 generates an angular velocity signal whose value has a plus sign and corresponds to the magnitude of the diminishing angular velocity. Angular velocity signals with a frequency higher than a predetermined frequency are extracted at the high-pass filter 51, amplified by the amplifier 52, and sent to the CPU 80.

The A/D converter 53 of the CPU 80 converts the angular velocity signals into digital signals and the averaging circuit 54 calculates the average value of 16 angular velocity signals. A drift component is removed from the averaged angular velocity signal by the subtractor 55.

The coring circuit 57 replaces any angular velocity signal equal to or smaller than a predetermined value with 0. After the coring process, the angular velocity signals are integrated and thereby converted into an angle signal by the integrating circuit 60. An angle signal equal to or larger than a predetermined value is replaced with a limit value. The value (absolute value) of the angle signal increases from 0 when camera shake occurs, and decreases to 0 when the camera shake subsides. Thus, the angle signal is 0 when there is no camera shake. The angle signal has a plus or minus sign depending on the direction of camera shake.

After being processed by the limiter, the angle signal is sent to the phase compensator 61 and subjected to phase compensation. After the phase compensation, the angle signal is multiplied by the mechanical coefficient by the multiplier 63 and thereby converted into a lens displacement signal. The adder 65 adds the reference voltage to the lens displacement signal thereby converts the lens displacement signal into a target lens position signal. The target lens position signal is inputted in the subtractor 70 after being multiplied by an amplification factor by a multiplier 66, where the amplification factor has been determined by the swing-back suppressor 74.

The subtractor 70 calculates a difference between the output signal of the X Hall element 40 and the target lens position signal and controls the direction and magnitude of the current passing through the coil 22 via the driver 72.

As described above, when there is no camera shake, the CPU 80 outputs the reference voltage (2.5 V) as the target lens position signal. When there is camera shake, the CPU 80 outputs a voltage larger or smaller than the reference voltage by a voltage corresponding to the displacement of the lens, as the target lens position signal. The driver 72 controls the direction and magnitude of the current passing through the coil 22 such that the output signal of the X Hall element 40 will coincide with the target lens position signal. Consequently, the compensation lens 12 moves via the X-slider 18, thereby reducing camera shake. When the camera shake subsides, since the target lens position signal becomes equal to the reference voltage, the X-slider 18 returns to the reference position.

First Embodiment

Figure 8:
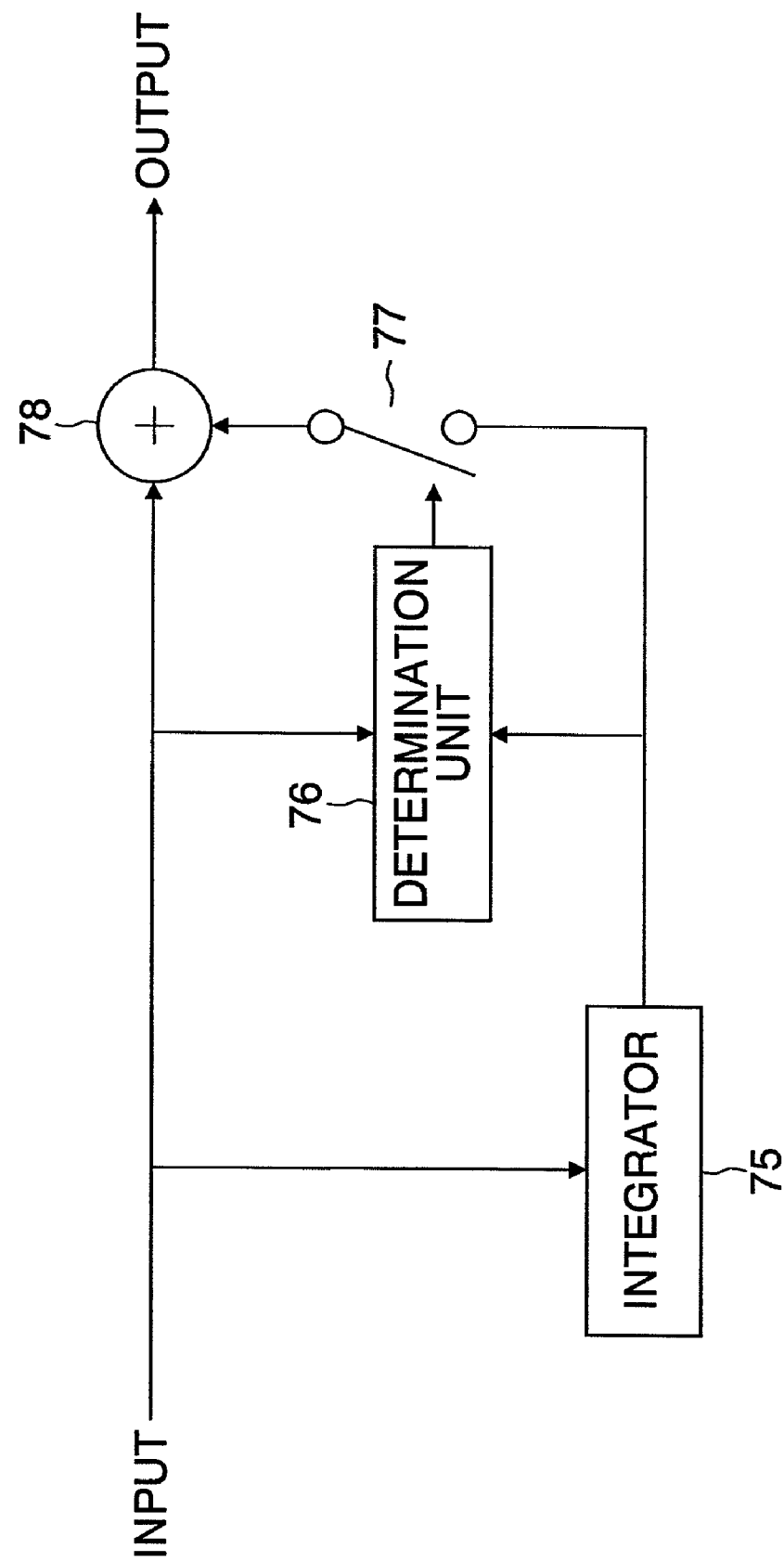
FIG. 8 is a block diagram showing a circuit configuration inside a swing-back suppressor 74.

Next, operation of the swing-back suppressor 74 of the digital camera 1 according to a first embodiment will be described. FIG. 8 is a block diagram showing a circuit configuration inside the swing-back suppressor 74.

The swing-back suppressor 74 includes an integrator 75, determination unit 76, switch 77, and adder 78. As described above, the angular velocity signal converted into a digital signal by the A/D converter 53 is inputted in the swing-back suppressor 74.

Figure 9:
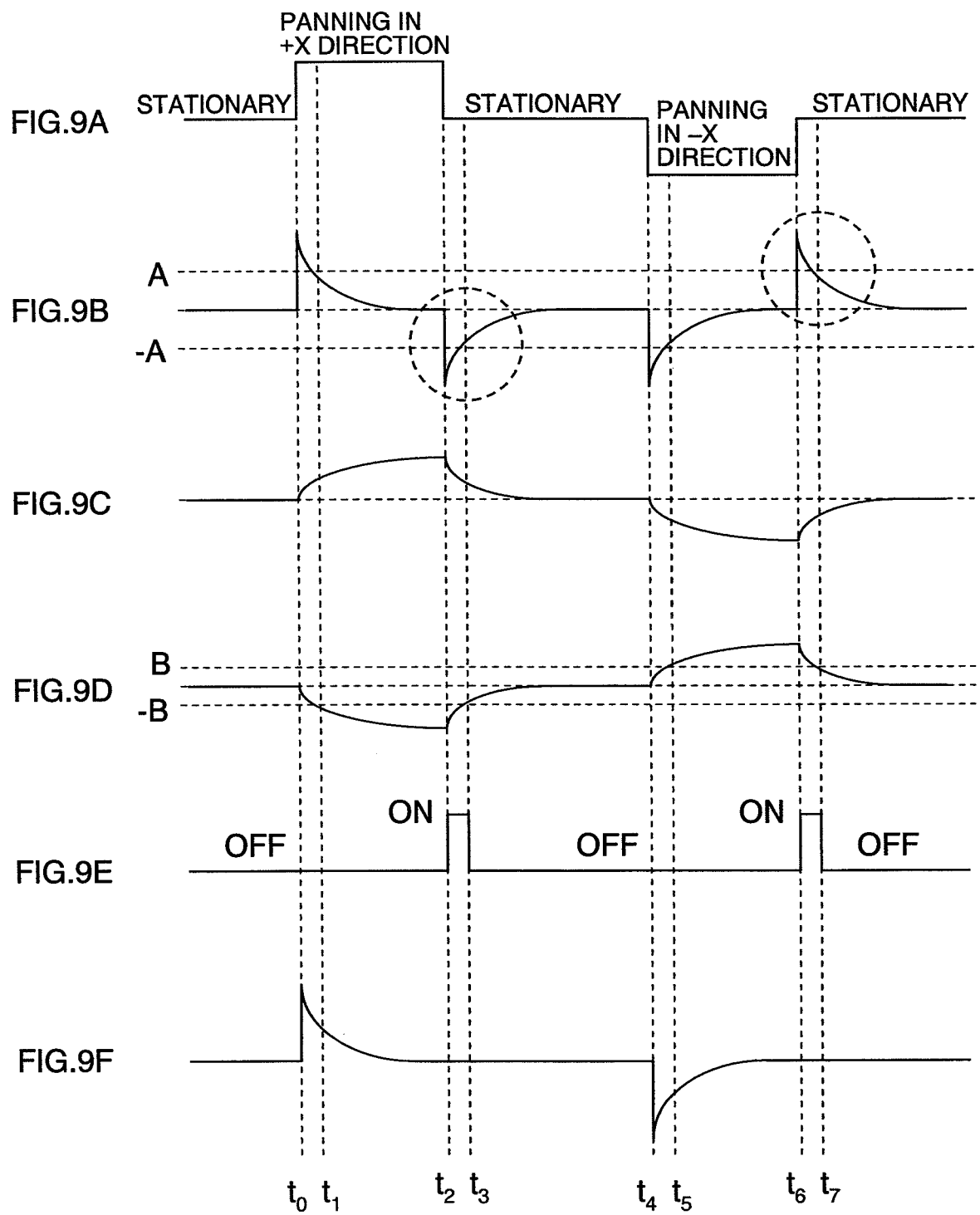
FIGS. 9A to 9F are diagrams showing output signals of an X gyro sensor 50, A/D converter 53, integrator 75, determination unit 76, and adder 78, respectively.

FIG. 9A shows an output signal of the X gyro sensor 50 when the digital camera 1 is stationary (static) (up to $t_0$), panned in the +X direction ($t_0$ to $t_2$), stationary ($t_2$ to $t_4$), panned in the −X direction ($t_4$ to $t_6$), and stationary (from $t_6$) in sequence.

The output signal of the X gyro sensor 50 has its low-frequency component removed by the high-pass filter 51. Then, the output signal is amplified by the amplifier 52, converted into a digital signal by the A/D converter 53, and inputted in the swing-back suppressor 74. FIG. 9B shows an input signal of the swing-back suppressor 74. At times $t_2$ and $t_6$, although the digital camera 1 is stationary, there are large-amplitude signals. These signal components cause a swing-back phenomenon.

In the swing-back suppressor 74, first the integrator 75 integrates the input signal. FIG. 9C shows an output signal of the integrator 75. The determination unit 76 determines whether to turn on the switch 77 based on the output signal of the A/D converter 53 shown in FIG. 9B and output signal of the integrator 75 shown FIG. 9C.

FIG. 10 is a diagram showing on/off criteria used by the determination unit 76 to determine whether to turn on or off the switch 77, wherein the output signal of the A/D converter 53 shown in FIG. 9B is designated by HPS, the inversion signal of the output signal of the integrator 75 shown in FIG. 9D is designated by −LPF, and the magnitude of the shake of the digital camera 1 estimated from the two signals is designated as shake. FIG. 10 also shows whether the output signal (HPF) of the A/D converter 53 is larger or smaller than a threshold A and whether the inversion signal (−LPF) of the output signal of the integrator 75 is larger or smaller than a threshold B.

Figure 11:
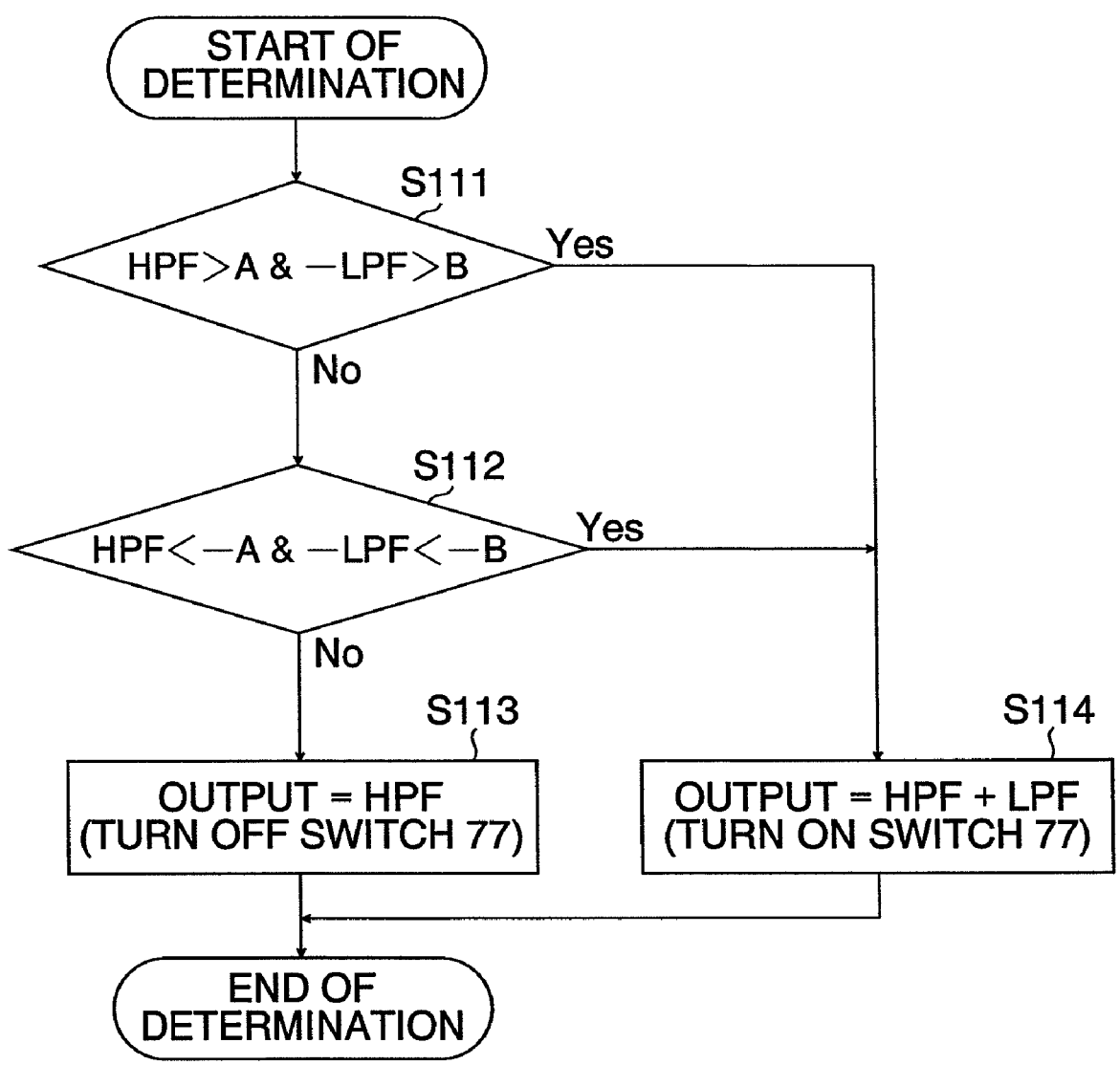
FIG. 11 is a flowchart showing operation performed by the determination unit 76 to determine whether to turn on or off the switch 77.

FIG. 11 is a flowchart showing operation performed by the determination unit 76 to determine whether to turn on or off the switch 77. First, the determination unit 76 determines whether the output signal (HPF) of the A/D converter 53 is larger than the threshold A and the inversion signal (−LPF) of the output signal of the integrator 75 is larger than the threshold B (Step S111). If the determination is affirmative, the determination unit 76 turns on the switch 77 (Step S114). Consequently, the output signal of the integrator 75 is inputted in the adder 78. Then, the adder 78 adds the signal to the output signal of the A/D converter 53 which is the input signal of the swing-back suppressor 74 and outputs the sum to the averaging circuit 54.

If the determination in Step S111 is negative, the determination unit 76 determines whether the output signal (HPF) of the A/D converter 53 is smaller than −A and the inversion signal (−LPF) of the output signal of the integrator 75 is smaller than −B (Step S112). If the determination is affirmative, the determination unit 76 turns on the switch 77 (Step S114). Consequently, the output signal of the integrator 75 is inputted in the adder 78 similarly.

If the determination is negative both in Steps S111 and S112, the determination unit 76 turns off the switch 77 (Step S113). Consequently, the adder 78 outputs the output signal (HPF) of the A/D converter 53 as it is to the averaging circuit 54.

Now, on/off operation of the switch 77 in each state in FIGS. 9A to 9F will be described. FIG. 9E shows on/off operation of the switch 77 and FIG. 9F shows output of the adder 78.

During the period up to $t_0$, since −A<HPF<A, the switch 77 is turned off. From $t_0$ to $t_1$, since HPF>A and −LPF>−B, the switch 77 is turned off. Also, from $t_1$ to $t_2$, since −A<HPF<A, the switch 77 is turned off. Thus, during the period up to $t_2$, as shown in FIG. 9F, the output signal of the adder 78 is the same as the output signal of the A/D converter 53 shown in FIG. 9B.

From $t_2$ to $t_3$, HPF<−A and −LPF<−B, which satisfies the condition in Step S112 in FIG. 11, and the switch 77 is turned on. When the switch 77 is turned on, the output signal (FIG. 9C) of the integrator 75 is inputted in the adder 78 and added to the output signal (FIG. 9B) of the A/D converter 53. When the two signals are added, the signal of the X gyro sensor 50 is reproduced. Thus, the output signal of the adder 78 from $t_2$ to $t_3$ is at the ground level as is the case with the output of the X gyro sensor 50 from $t_2$ to $t_3$ in FIG. 9A. In this way, a swing-back component signal which can cause a swing-back phenomenon is removed during the period from $t_2$ to $t_3$ shown in FIG. 9B.

Furthermore, from $t_3$ to $t_4$, since −A<HPF<A, the switch 77 is turned off. From $t_4$ to $t_5$, since HPF<−A and −LPF>−B, the switch 77 is turned off. Also, from $t_5$ to $t_6$, since −A<HPF<A, the switch 77 is turned off. Thus, during the period from $t_3$ to $t_6$, as shown in FIG. 9F, the output signal of the adder 78 is the same as the output signal of the A/D converter 53 shown in FIG. 9B.

From $t_6$ to $t_7$, HPF>A and −LPF>B, which satisfies the condition in Step S111 in FIG. 11, and the switch 77 is turned on. As in the case of the period from $t_2$ to $t_3$, when the switch 77 is turned on, the output signal of the adder 78 from $t_6$ to $t_7$ is at the ground level as with the output of the X gyro sensor 50 from $t_6$ to $t_7$ in FIG. 9A. In this way, a swing-back component signal which can cause a swing-back phenomenon is removed during the period from $t_6$ to $t_7$ shown in FIG. 9B.

Furthermore, at $t_7$ and later, since −A<HPF<A, the switch 77 is turned off.

In this way, the detection as to whether a swing-back component signal which can cause a swing-back phenomenon is generated in the high-pass filter 51 is made based on whether "the output signal of the A/D converter 53 is larger than the threshold A and the inversion signal of the output signal of the integrator 75 is larger than the threshold B" and whether "the output signal of the A/D converter 53 is smaller than −A and the inversion signal of the output signal of the integrator 75 is smaller than −B."

If any of the above conditions is detected, the output signal of the integrator 75 is added to the output signal to the subsequent stage by the adder 78 to reproduce the output signal of the X gyro sensor 50 free of overshoot and thereby prevent the swing-back phenomenon.

By using the same configuration for the Y direction, it is possible to prevent a swing-back phenomenon in tilting.

Although a gyro sensor which detects angular velocity is used in the embodiment of the present invention, a gyro sensor which detects velocity may be used alternatively.

Although in the embodiment of the present invention, camera shake compensation is made by controlling the compensation lens according to the shake, camera shake compensation is not limited to this type and may be made by controlling the position of an image pickup element. Besides, the present invention is also applicable to a system which makes camera shake compensation by controlling a flexion angle of a refractive optical system (folded optical system) or a system which makes camera shake compensation by controlling an image pickup lens or image pickup element. Furthermore, the present invention is also applicable to camera shake compensation of film-based analog cameras.

What is claimed is:

1. A shake detection apparatus comprising:
    a sensor which detects velocity or angular velocity;
    a high-pass filter which removes a low-frequency component from an output signal of the sensor;
    a shake detection device which detects shake of an apparatus body based on an output signal from the high-pass filter;
    a determination device which determines whether the output signal of the high-pass filter contains a swing-back component outputted when a shake continued in one direction stops; and
    a removal device which removes the swing-back component from the output signal of the high-pass filter based on a determination result of the determination device, wherein
    the determination device comprises an integrating device that integrates the output signal of the high-pass filter, and
    the determination device determines that the output signal of the high-pass filter contains the swing-back component when the output signal of the high-pass filter is larger than a first threshold and an inversion signal of the output signal of the integrating device is larger than a second threshold or when the output signal of the high-pass filter is smaller than the negative of the first threshold and an inversion signal of an output signal of the integrating device is smaller than the negative of the second threshold.

2. The shake detection apparatus according to claim 1, wherein
    the removal device comprises an adder device which adds the output signal of the high-pass filter and the output signal of the integrating device, and
    the removal device outputs the output signal of the high-pass filter as it is when the determination device determines that no swing-back component is contained in the output signal of the high-pass filter, and outputs an output signal obtained by adding the output signal of the high-pass filter and the output signal of the integrating device when the determination device determines that the swing-back component is contained in the output signal of the high-pass filter.

* * * * *